US011219889B2

(12) United States Patent
Tanev et al.

(10) Patent No.: US 11,219,889 B2
(45) Date of Patent: Jan. 11, 2022

(54) METHANE OXIDATION CATALYST, PROCESS TO PREPARE THE SAME AND METHOD OF USING THE SAME

(71) Applicant: SHELL OIL COMPANY, Houston, TX (US)

(72) Inventors: Peter Tanev Tanev, Houston, TX (US); Mario Soorholtz, Mannheim (DE)

(73) Assignee: SHELL OIL COMPANY, Houston, TX (US)

(*) Notice: Subject to any disclaimer, the term of this patent is extended or adjusted under 35 U.S.C. 154(b) by 463 days.

(21) Appl. No.: 16/328,598

(22) PCT Filed: Aug. 16, 2017

(86) PCT No.: PCT/EP2017/070732
§ 371 (c)(1),
(2) Date: Feb. 26, 2019

(87) PCT Pub. No.: WO2018/041632
PCT Pub. Date: Mar. 8, 2018

(65) Prior Publication Data
US 2021/0322965 A1    Oct. 21, 2021

Related U.S. Application Data

(60) Provisional application No. 62/381,664, filed on Aug. 31, 2016.

(51) Int. Cl.
| *B01J 37/02* | (2006.01) |
| *B01J 6/00* | (2006.01) |
| *F01N 3/28* | (2006.01) |
| *B01J 35/00* | (2006.01) |
| *B01J 23/44* | (2006.01) |
| *B01J 21/06* | (2006.01) |

(52) U.S. Cl.
CPC ........... *B01J 37/0207* (2013.01); *B01J 6/001* (2013.01); *B01J 21/066* (2013.01); *B01J 23/44* (2013.01); *B01J 35/002* (2013.01); *B01J 37/0213* (2013.01); *B01J 37/0217* (2013.01); *B01J 37/0236* (2013.01); *F01N 3/2828* (2013.01)

(58) Field of Classification Search
CPC . B01J 6/001; B01J 21/066; B01J 23/44; B01J 35/002; B01J 37/0207; B01J 37/0213; B01J 37/0217; B01J 37/0236; F01N 3/2828
See application file for complete search history.

(56) References Cited

U.S. PATENT DOCUMENTS

| 4,809,154 | A | 2/1989 | Newton |
| 5,326,253 | A | 7/1994 | Dalla Betta et al. |
| 5,405,260 | A | 4/1995 | Della Betta et al. |
| 5,741,467 | A | 4/1998 | Williamson et al. |
| 6,037,303 | A * | 3/2000 | Peratello ............... B01J 21/066 |
| | | | 502/217 |
| 6,037,307 | A | 3/2000 | Campbell et al. |
| 6,391,276 | B1 | 5/2002 | Suda et al. |
| 6,602,481 | B1 | 8/2003 | Ohtsuka et al. |
| 7,364,712 | B2 | 4/2008 | Ohtuska et al. |
| 7,524,474 | B2 | 4/2009 | Hedouin |
| 9,481,594 | B2 | 11/2016 | Gaubil et al. |
| 10,512,896 | B2 | 12/2019 | Tanev et al. |
| 2006/0178261 | A1 | 8/2006 | Larcher et al. |
| 2006/0280667 | A1 | 12/2006 | Oonkj et al. |
| 2011/0214412 | A1 | 9/2011 | Chiffey et al. |
| 2013/0164201 | A1 | 6/2013 | Hernandez et al. |
| 2014/0001407 | A1 | 1/2014 | Milanov et al. |
| 2015/0314274 | A1* | 11/2015 | Shen ..................... C07C 29/132 |
| | | | 568/863 |
| 2016/0003529 | A1 | 1/2016 | Minta et al. |
| 2018/0043334 | A1* | 2/2018 | Tanev ................. B01J 35/1014 |
| 2019/0046958 | A1 | 2/2019 | Wei et al. |

FOREIGN PATENT DOCUMENTS

| CN | 88100589 A | 9/1988 |
| CN | 102759555 A | 10/2012 |
| CN | 103249676 A | 8/2013 |
| CN | 103433026 A | 12/2013 |
| CN | 103962123 A | 8/2014 |
| CN | 104353455 A | 2/2015 |
| EP | 1790412 A1 | 5/2007 |
| JP | S59156434 A | 9/1984 |
| JP | H11319559 A | 11/1999 |
| JP | 2000176289 A | 6/2000 |
| JP | 2003245549 A | 9/2003 |
| JP | 2004223381 A | 8/2004 |
| JP | 2006181569 A | 7/2006 |
| JP | 2007090331 A | 4/2007 |
| JP | 2011212508 A | 10/2011 |

(Continued)

OTHER PUBLICATIONS

International Search Report and Written Opinion received for PCT Patent Application No. PCT/EP2017/070711, dated Nov. 6, 2017, 15 pages.
International Search Report and Written Opinion received for PCT Patent Application No. PCT/EP2016/054490, dated Aug. 11, 2016, 19 pages.
International Search Report and Written Opinion received for PCT Patent Application No. PCT/EP2017/070732, dated Nov. 6, 2017, 25 pages.
International Search Report and Written Opinion received for PCT Patent Application No. PCT/EP2017/068577, dated Oct. 13, 2017, 12 pages.
Mirkelamoglu et al., "Dual-Catalyst Aftertreatment of Lean-Burn Engine Exhaust", Catalysis Today, vol. 151, Issue No. 3-4, Jun. 19, 2010, pp. 386-394, XP027065546.

(Continued)

*Primary Examiner* — Brian A McCaig
(74) *Attorney, Agent, or Firm* — Shell Oil Company

(57) ABSTRACT

The invention provides a process for preparing a methane oxidation catalyst, a methane oxidation catalyst thus prepared and a method of oxidizing methane.

17 Claims, No Drawings

(56) References Cited

FOREIGN PATENT DOCUMENTS

| JP | 2013169480 A | 9/2013 |
|----|--------------|--------|
| RU | 2530066 C1 | 10/2014 |
| WO | 9209848 A1 | 6/1992 |
| WO | 9824726 A1 | 6/1998 |
| WO | 2005044957 A2 | 5/2005 |
| WO | 2009057961 A2 | 5/2009 |
| WO | 2009063092 A2 | 5/2009 |
| WO | 2009098278 A2 | 8/2009 |
| WO | 2014001423 A1 | 1/2014 |
| WO | 2016139283 A1 | 9/2016 |

OTHER PUBLICATIONS

Cordoba et al., "No Reduction by CH4 Over Pd/Co-Sulfated Zirconia Catalysts", Applied Catalysis B: Environmental, vol. 56, Issue No. 4, Apr. 8, 2005, pp. 269-277, XP027813907.

Amairia et al., "Sol Gel Derived Pd/A12O3—ZrO2 as Catalysts for Methane Combustion: Effect of Zirconium Loading", Journal of Sol-Gel Science and Technology, vol. 54, Issue No. 1, Jan. 21, 2010, pp. 29-35, XP019792512.

Meimei, "Development of Sol-Gel Prepared Palladium-Based Sulfated Zirconia Catalysts for Nitrogen Oxides Reduction with Methane", Thesis, Jan. 1, 2009, XP002743153.

Tidahy et al., "Nanostructured Macro-mesoporous Zirconia Impregnated by Noble Metal for Catalytic Total Oxidation of Toluene", Catalysis Today, Elsevier, vol. 137, Issue No. 2-4, Sep. 30, 2008, pp. 335-339, XP023438000.

Filiz et al., "Highly Selective Hydrogenation of Levulinic Acid to γ-Valerolactone over Ru/ZrO2 Catalysts", Catalysis Letters, vol. 147, Issue No. 7, May 24, 2017, pp. 1744-1753, XP036253234.

Kovtunov et al., "Heterogeneous Addition of H2 to Double and Triple Bonds over Supported Pd Catalysts: a Parahydrogen-Induced Polarization Technique Study", Physical Chemistry Chemical Physics, vol. 14, Issue No. 31, Jan. 1, 2012, p. 11008, XP055226901.

Kundakovic et al., "Deep Oxidation of Methane over Zirconia Supported Ag Catalysts", Applied Catalysis A General, vol. 183, Issue No. 1, Jul. 5, 1999, pp. 35-51, XP004271828.

Wang et al., "Structural Evolution and Catalytic Properties of Nanostructured Cu/ZrO2 Catalysts Prepared by Oxalate Gel-Coprecipitation Technique", Journal of Physical Chemistry C, vol. 111, Issue No. 44, Nov. 1, 2007, pp. 16549-16557, XP055328349.

Pettersen et al., "Technical and Operational Innovation far Onshore and Floating LNG", 17th International Conference and Exhibition on Liquefied Natural Gas, Apr. 16-19, 2013, 12 pages, XP055134869.

Faticanti et al., "Pd Supported on Tetragonal Zirconia: Electrosynthesis, Characterization and Catalytic Activity toward CO Oxidation and CH4 Combustion", Applied Catalysis B: Environmental, vol. 60, Issue No. 1-2, Sep. 1, 2005, pp. 73-82, XP027813751.

Bautista et al., "Influence of Sulphate Doping on Pd/Zirconia Based Catalysts for the Selective Catalytic Reduction of Nitrogen Oxides with Methane", Applied Catalysis B: Environmental, vol. 71, Issue No. 3-4, 2007, pp. 254-261.

Ohtsuka, "The Oxidation of Methane at Low Temperatures over Zirconia-Supported Pd, Ir and Pt Catalysts and Deactivation by Sulfur Poisoning", Catalysis Letter, vol. 141, Issue No. 3, Mar. 2011, pp. 413-419.

Guorong et al., "Preparation of Nano-TiO2 by Sol-Gel Method and Its Phase Transformation", Proceedings of the 9th National Conference on Applied Chemistry of the Chinese Chemical Society, Sep. 30, 2005, p. 56.

Yang et al., "Influence of Crystal Form of Zro2 Support on Catalytic Combustion Performance of Pdo/zro2 System", Proceedings of the 9th National Youth Catalytic Conference, pp. 41-42.

\* cited by examiner

METHANE OXIDATION CATALYST, PROCESS TO PREPARE THE SAME AND METHOD OF USING THE SAME

CROSS REFERENCE TO EARLIER APPLICATION

The present application is a National Stage (§ 371) application of PCT/EP2017/070732, filed Aug. 16, 2017, which claims priority benefits of U.S. Application No. 62/381,664, filed Aug. 31, 2016, the disclosure of which is incorporated by reference herein.

FIELD OF INVENTION

The instant invention relates to a methane oxidation catalyst, a process to prepare a methane oxidation catalyst, the methane oxidation catalyst prepared by this process and a method of using the methane oxidation catalysts.

BACKGROUND OF THE INVENTION

One of the most abundant and economically viable alternatives to oil-derived fuels such as gasoline, kerosene and diesel is natural gas. Because of this, engine manufacturers for transport and stationary applications are shifting their attention from the traditional oil-derived fuels to the cheaper, cleaner burning, and more environmentally friendly compressed natural gas (CNG) or liquefied natural gas (LNG) fuels. In recent years, significant investments and efforts have been made to expand the natural gas fuel supply chain/infrastructure and develop natural gas specific engine hardware in order to enable the broad deployment of natural gas as s fuel. The major component in natural gas is methane. The exhaust gas of a natural gas fueled engine may contain some residual level of methane, which has to be removed before the exhaust gas is released into the atmosphere in order to meet current and future environmental emission regulations. One way of reducing the level of residual methane in the exhaust gas is by catalytically oxidizing the methane to carbon dioxide and water. Catalysts in current day catalytic converters used to treat exhaust gas are not designed to convert methane. Due to the relatively high activation temperature required for the combustion of methane, methane will typically pass through such catalytic converters unconverted.

Catalysts for methane oxidation have been reported previously. In WO2009/057961 a catalyst containing palladium and platinum supported on alumina for treating exhaust gas from a dual fuel, i.e. diesel and LNG, fueled vehicle is disclosed. The catalysts are said to have a preferred palladium: platinum ratio of 1.0:0.1-0.3 and are deposited on an alumina support. However, the performance advantage of these palladium-platinum/alumina materials was demonstrated without the presence of $H_2O$ in the feed. It is well known that exhaust gases from natural gas fueled engines in transport and stationary applications contain very high levels of $H_2O$ usually in the range of 9-17 vol %. These significant $H_2O$ levels in exhaust gas are known to have a very significant adverse effect on the activity of palladium-platinum/alumina catalysts and the stability of these catalysts in the methane oxidation reaction. Therefore, it is expected that these prior art alumina-based catalysts will suffer from excessive activity loss and activity decline rates in commercial applications involving conversion of methane in exhaust gases containing significant levels of water.

U.S. Pat. No. 5,741,467 discloses mixed palladium/alumina and palladium/ceria/lanthana alumina wash coat formulations used as methane oxidation catalysts for fuel-lean or fuel-rich methane oxidation, respectively. In addition, U.S. Pat. No. 5,741,467 discloses that rhodium may be used to substitute completely or in part for the palladium. However, these catalytic formulations exhibit very low methane oxidation activity after aging as illustrated by their high temperature requirements (higher than 500° C.) for 50 vol % methane conversion, generally referred to in the art as the $T_{50}$ ($CH_4$). The low methane oxidation activities and rapid activity declines exhibited by these catalysts suggest that these catalytic formulations would most likely not find acceptance or utility for methane abatement in commercial natural gas-fueled engines exhaust gas treatment applications.

US660248 discloses catalysts for removing hydrocarbons from exhaust gas containing methane and excess of oxygen. The catalysts comprise palladium or palladium/platinum supported on at least one support selected from zirconia, sulfated zirconia and tungsten-zirconia. The disclosed zirconia-based catalysts show improved performance compared to the previously discussed alumina-based catalyst with respect to methane oxidation activity, however the as-reported activity of these catalysts is still too low to be attractive for commercial application.

Therefore, there is a need for methane oxidation catalysts that exhibit higher methane oxidation activity for the efficient removal of non-combusted methane from exhaust gas from natural gas-fueled engines.

SUMMARY OF THE INVENTION

It has now been found that a catalyst comprising one or more noble metals supported on zirconia may show improved methane oxidation performance, when the zirconia comprises tetragonal and monoclinic zirconia in a specific weight ratio range.

Accordingly, the present invention provides a process for preparing a methane oxidation catalyst comprising the following steps:

a.) calcining a non-modified zirconia precursor at a temperature in the range of from 675 to 1050° C. to prepare tetragonal zirconia wherein the weight ratio of tetragonal zirconia to monoclinic zirconia, if any is present, is greater than 31:1;

b.) impregnating the zirconia obtained from step b.) with a noble metal precursor-comprising impregnation solution;

c.) drying the wet, noble metal-impregnated zirconia at a temperature of no more than 120° C.; and d.) calcining the dried noble metal-impregnated zirconia at a temperature in the range of from 400 to 650° C. to prepare a methane oxidation catalyst wherein the weight ratio of tetragonal zirconia to monoclinic zirconia of the catalyst is in the range of from 1:1 to 31:1.

The methane oxidation catalyst made by this process provides higher methane oxidation activity, as evidenced by its lower $T_{50}$ ($CH_4$) temperatures, as well as better long term hydrothermal stability compared to those methane oxidation catalysts known in the prior art.

In a further aspect, the present invention provides for a method of oxidizing methane by contacting a gas stream comprising methane with a methane oxidation catalyst according to the invention in the presence of oxygen and oxidizing at least part of the methane in the gas stream to carbon dioxide and water.

DETAILED DESCRIPTION OF THE INVENTION

The present invention provides methane oxidation catalysts comprising one or more noble metals supported on zirconia, which zirconia comprises both tetragonal zirconia (also referred to as t-$ZrO_2$) and monoclinic zirconia (also referred to as m-$ZrO_2$).

The zirconia comprising both tetragonal zirconia and monoclinic zirconia as used in the catalyst of the present invention is not a physical mixture of tetragonal zirconia and monoclinic zirconia or equally is not a physical mixture of the crystallographic phases of tetragonal zirconia and monoclinic zirconia. Rather, the zirconia used in the catalyst of the present invention was obtained by converting, e.g. thermally converting, a noble metal impregnated zirconia material into a methane oxidation catalyst comprising both tetragonal zirconia and monoclinic zirconia resulting in a dispersion of tetragonal and monoclinic zirconia phases. Such zirconia, comprising both tetragonal zirconia and monoclinic zirconia, prepared by conversion of a precursor material is herein further also referred to as tm-$ZrO_2$. It was found that methane oxidation catalysts comprising noble metals supported on such tm-$ZrO_2$ of the present invention surprisingly exhibit significantly superior methane oxidation performance, in particular, methane oxidation activity, compared to prior art methane oxidation catalysts at the same levels of noble metal loading. Moreover, it was found that methane oxidation catalysts comprising noble metals supported on such tm-$ZrO_2$ of the present invention also surprisingly exhibit significantly superior methane oxidation activity compared to methane oxidation catalysts comprising the same level of noble metals supported on a physical mixture of tetragonal zirconia and monoclinic zirconia, where the tetragonal zirconia and monoclinic zirconia were physically mixed in the same weight ratio.

The methane oxidation catalyst according to the present invention comprises one or more noble metals supported on zirconia. Reference herein to the term "supported on" is to noble metals that are supported on the internal and external structure surface of the zirconia, including on the wall surface of any inner pore structure of the zirconia.

As mentioned hereinabove, the zirconia of the present invention on which the noble metal is supported comprises at least two crystalline phases of zirconia, i.e. tetragonal zirconia and monoclinic zirconia. The weight ratio of tetragonal zirconia to monoclinic zirconia is in the range of from 1:1 to 31:1, preferably in the range of from 2:1 to 31:1, even more preferably 2:1 to 28:1, still more preferably 5:1 to 28:1, even still more preferably the range from 10:1 to 27.5:1 and yet even more preferably in the range of from 15:1 to 25:1, yet still even more preferably, 15:1 to 23:1. It has been found that catalysts comprising noble metals supported on a tm-$ZrO_2$ with the above weight ratio range of tetragonal zirconia to monoclinic zirconia result in an improved methane oxidation activity, i.e. in a lower $T_{50}$ ($CH_4$) value, compared to other prior art zirconia- or alumina-comprising catalysts for methane oxidation with the same noble metal loading. The temperature at which at least 50 vol % of the methane is oxidized is referred to herein as $T_{50}$ ($CH_4$). The $T_{50}$ ($CH_4$) value is a measure for the methane oxidation activity of a catalyst. A lower $T_{50}$ ($CH_4$) value indicates a higher methane oxidation activity of the catalyst. When measured under essentially identical test conditions, the $T_{50}$ ($CH_4$) values can be used to compare the methane oxidation activity of two or more catalysts. It was also found that providing a weight ratio of tetragonal zirconia to monoclinic zirconia in the methane oxidation catalyst according to the present invention may result in improved methane oxidation activity stability over prolonged periods of use under hydrothermal conditions.

Herein, the weight ratio of the tetragonal zirconia to monoclinic zirconia is the weight ratio as determined by a quantitative XRD phase analysis using commercially available software. The so determined weight ratio of tetragonal zirconia to monoclinic zirconia in the range from 1:1 to 31:1 corresponds to an XRD signal intensity ratio of signal intensity at 2θ=30.1° (characteristic for tetragonal zirconia) to the signal intensity at 2θ=28.1° (characteristic for monoclinic zirconia) in the range of from 0.8:1 to 12.5:1. A more detailed description of the quantitative XRD phase analysis as used in this invention is provided herein below.

For the purpose of determining the weight ratio of the tetragonal zirconia to monoclinic zirconia, any other zirconia, e.g. a zirconia binder material that is added to the catalyst by physical mixing is not taken into consideration.

As mentioned herein above, the zirconia on which the noble metal(s) are supported comprises tetragonal and monoclinic zirconia. Preferably, the monoclinic zirconia is present as a dispersion of monoclinic zirconia in the tetragonal zirconia or even as a dispersion of monoclinic zirconia in a (semi-)continuous tetragonal zirconia matrix. Such a structure could for instance be prepared by the calcination of a single zirconia precursor followed by a chemical treatment such as an impregnation step and further thermal treatment step, i.e., a calcination step. The zirconia precursor is preferably thermally treated by a calcination step at a temperature in the range of from 675 to 1050° C. and then impregnated with a noble metal solution and thermally treated again at temperatures in the range of from 450 to 650° C.

Without wishing to be bound to any particular theory, it is believed that such a distribution of tetragonal and monoclinic crystalline zirconia phases cannot be attained by physically mixing tetragonal zirconia with monoclinic zirconia. Furthermore, without wishing to be bound to any particular theory, it is believed that by preparing the zirconia of the catalyst of the present invention, i.e. the tm-$ZrO_2$, from a single zirconia precursor, the resulting distribution of tetragonal zirconia and monoclinic zirconia in the tm-$ZrO_2$ allows for the creation of a high noble metal or metal oxide dispersion on the resulting catalyst. Furthermore, this may provide a catalyst having an advantageously high noble metal surface area and/or noble metal oxide surface area. The obtained distribution of tetragonal zirconia and monoclinic zirconia in the tm-$ZrO_2$ is believed to restrict the diffusion, migration and/or agglomeration of the noble metal or noble metal oxide during preparation as well as during use, including the use under typical hydrothermal methane oxidation operating conditions. This benefits the methane oxidation activity and improves the stability of the methane oxidation activity of the catalyst of this invention, including under hydrothermal conditions, such as the conditions typically encountered in treating exhaust gas from natural gas fueled engines.

As explained herein below in more detail, the zirconia precursor may be any zirconium-comprising compound that converts into zirconia upon exposure to elevated temperatures. The zirconia precursor may also comprise, consist or essentially consist of tetragonal zirconia. Without wishing to be bound to any particular theory, it is believed that upon exposing the zirconia precursor to elevated temperatures first tetragonal zirconia is formed, which tetragonal zirconia may subsequently after impregnation with a noble metal and further thermal treatment be partially converted to monoclinic zirconia. By preparing the zirconia of the present invention by one or more thermal, impregnation and further heat treatment steps from a single zirconia precursor, a dispersion of monoclinic zirconia in tetragonal zirconia may be obtained. As mentioned herein above, preferably, the zirconia on which the noble metal is supported comprises tetragonal zirconia that forms a (semi-) continuous matrix structure, with embedded monoclinic zirconia in the matrix structure. Suitable zirconia precursors are provided herein below.

The zirconia on which the noble metal is supported may preferably comprise a specific surface area in the range of from 10 to 200 $m^2/g$.

The methane oxidation catalyst according to the invention comprises one or more noble metals. Any combination of two or more noble metals may be used. Preferably, the methane oxidation catalyst comprises one or more noble metals selected from the group consisting of palladium, platinum, ruthenium, rhodium, osmium and iridium. Preferably, the methane oxidation catalyst comprises one or more noble metals selected from the group consisting of palladium, platinum and rhodium. Preferred combinations of noble metals comprise: (1) palladium and platinum, (2) palladium and rhodium, and (3) palladium, platinum and rhodium. Such combinations of noble metals may provide a methane oxidation catalyst with higher methane oxidation activity, i.e. a lower $T_{50}$ ($CH_4$) value and a more stable methane oxidation activity.

The methane oxidation catalyst may comprise in the range of from 0.5 to 15 wt % of noble metal, based on the total combined weight of noble metal(s) and the total weight of the tm-$ZrO_2$. Preferably, the methane oxidation catalyst comprises at least 1 wt % of noble metal, based on the total combined weight of noble metal(s) and the total weight of the tm-$ZrO_2$.

Typically, the active form of the noble metal capable of catalyzing the oxidation of methane is its metal oxide form. This is for instance true for palladium. However, in some cases, for example, where both palladium and platinum are present on the catalyst, a portion of the noble metal will remain in its metallic form. Therefore, preferably, at least part of noble metal(s) is present in the methane oxidation catalyst in the form of noble metal oxides.

The methane oxidation catalyst may have any suitable shape or form including powders, particles, coatings, washcoats, films, extrudates, rings, pellets, tablets or ceramic monoliths of various shapes and sizes. Preferably, the methane oxidation catalyst is provided as a particle with an average particle size in the range of from 0.1 to 500 μm, preferably of from 0.5 to 500 μm. The particles may e.g. be in the form of powders or in a washcoat. The methane oxidation catalyst may comprise zirconia particles that have been shaped to form the above mentioned larger catalyst structures. The methane oxidation catalyst may for instance be shaped in a process including extrusion and spray drying.

The methane oxidation catalyst may optionally contain a binder material.

The methane oxidation catalyst may be deposited on a monolith substrate in the form of a coating, washcoat or film. Reference herein to a washcoat is to a dispersion of a material, in this case the methane oxidation catalyst particles, over the surface area of the substrate, whereby the washcoated material forms a thin layer on the surface of the substrate. Suitable substrates include ceramic and metallic monoliths. Such ceramic and metallic monoliths are substrates with nearly uniform, well-defined pore or channel structures. The ceramic and metallic monoliths may be characterized by the number of pore channels per square inch; this unit is also referred to in the art as cells per square inch or CPSI. Preferably, the ceramic or metallic monolith substrate comprises in the range of from 50 to 10,000 pore channels per square inch (323 to 64500 pore channels per $cm^2$), more preferably, 150 to 1000 pore channels per square inch (968 to 6450 pore channels per $cm^2$).

In one preferred embodiment, the methane oxidation catalyst of the invention is provided on a ceramic or metallic monolith substrate comprising pore channels, defining an inner pore channel surface, wherein the methane oxidation catalyst is present in the form of a coating, washcoat or a film of a thickness in the range of from 10 to 250 μm on the monolith inner pore channel surface. Preferably, in the range of from 50 to 400 kg, more preferably of from 75 to 300 kg, of methane oxidation catalyst per cubic meter of monolith substrate is supported on the monolith substrate. Preferably, the resulting noble metal content on the monolith is in the range of from 1 to 16 $kg/m^3$ of monolith substrate, more preferably in the range of from 1 to 8 $kg/m^3$ of monolith substrate.

It is a particular advantage of the methane oxidation catalyst according to the invention that it provides higher methane oxidation activity or lower $T_{50}$ ($CH_4$) values as well as better long term hydrothermal stability compared to those methane oxidation catalysts known in the prior art.

It is a further particular advantage of the methane oxidation catalyst according to the invention that it may also show activity toward the conversion of NO to $NO_2$. This may be of particular value when the methane oxidation catalyst is to be used in an application wherein next to methane, there is a desire to convert NO (and optionally $NO_2$) to environmentally benign $N_2$ by using a combination of methane oxidation catalyst to convert the NO to $NO_2$ and then a commercially available SCR (selective catalytic reduction) catalyst to reduce NO and/or $NO_2$ to $N_2$. This may, for instance, be the case where the exhaust gas to be treated comprises methane and NO. An example of such a gas stream would be an exhaust gas from a natural gas fueled engine. The methane oxidation catalyst may therefore in a particular embodiment of the invention, be provided in combination with a SCR catalyst, e.g. a SCR catalyst comprising titanium (IV) oxide ($TiO_2$), tungsten (VI)oxide ($WO_3$), vanadium (V)oxide ($V_2O_5$), molybdenum(VI) oxide, noble metals, transition metal-exchanged zeolite or a zeolite. The methane oxidation catalyst only needs to convert part of the NO to $NO_2$ as most SCR catalysts show a more optimal conversion to $N_2$ where a mixture of NO and $NO_2$ is provided to the SCR catalyst.

As mentioned herein before, the catalyst of the present invention shows improved methane oxidation activity, which is evidenced by the lower $T_{50}$ ($CH_4$) values obtained when oxidizing methane, in particular methane present in diluted methane comprising gas streams. In particular, in the case of the oxidation of methane in a gas stream consisting of less than 5000 ppmv of methane and balance of nitrogen, based on the volume of the total gas stream, the $T_{50}$ ($CH_4$) of the methane oxidation catalyst may be equal to or less than 405° C. for the catalyst according to the invention. In the particular case, where the weight ratio of tetragonal to monoclinic zirconia in the t/m-$ZrO_2$ is in the range of from 5:1 to 28:1, the $T_{50}$ ($CH_4$) value of the methane oxidation catalyst may be equal to or less than 400° C. Furthermore, in the particular case, where the weight ratio of tetragonal to monoclinic zirconia in the t/m-$ZrO_2$ is in the range of from 15:1 to 25:1 the $T_{50}$ ($CH_4$) value of the methane oxidation catalyst may be equal to or less than 395° C. More in particular, in the case of the oxidation of methane in a gas stream having a composition consisting of 2000 ppmv $CH_4$, 1000 ppmv CO, 150 ppmv NO, 7.5 vol % $CO_2$, 6 vol % $O_2$, 15 vol % $H_2O$, and balance of $N_2$, based on the volume of the total gas stream, the $T_{50}$ ($CH_4$) value of the methane oxidation catalyst may be equal to or less than 405° C. for the catalyst according to the invention. In the particular case, where the weight ratio of tetragonal to monoclinic zirconia in the t/m-$ZrO_2$ is in the range of from 5:1 to 28:1 the $T_{50}$ ($CH_4$) value of the methane oxidation catalyst may be equal to or less than 400° C. Furthermore, in the particular case where the weight ratio of tetragonal to monoclinic zirconia in the t/m-$ZrO_2$ is in the range of from 15:1 to 25:1 the $T_{50}$ ($CH_4$) value of the methane oxidation catalyst may be equal to or less than 395° C.

In another aspect the invention provides a process for preparing a methane oxidation catalyst. The process for preparing a methane oxidation catalyst comprising the following steps:
a.) calcining a non-modified zirconia precursor at a temperature of in the range of from 675 to 1050° C. to prepare tetragonal zirconia wherein the weight ratio of tetragonal zirconia to monoclinic zirconia, if any is present, is greater than 31:1;
b.) impregnating the zirconia obtained from step b.) with a noble metal precursor-comprising impregnation solution;
c.) drying the wet noble metal-impregnated zirconia at a temperature of no more than 120° C.; and d.) calcining the dried noble metal-impregnated zirconia at a temperature of in the range of from 400 to 650° C. to prepare a methane oxidation catalyst wherein the weight ratio of tetragonal zirconia to monoclinic zirconia of the catalyst is in the range of from 1:1 to 31:1.

In step (a) a zirconia precursor may be provided in a calcined form. Preferably, a single zirconia precursor is provided. Any zirconia precursor that can be converted into a dispersion of tetragonal and monoclinic zirconia by the method herein described may be used.

In one embodiment, the zirconia precursor is tetragonal zirconia. During the calcination in step (a) at least part of the tetragonal zirconia may be converted to monoclinic zirconia. In some instances, small nuclei of monoclinic zirconia will be created in the tetragonal matrix during step (a) that may not be discernable via powder XRD measurement. In these instances, the calcined zirconia of the step (a) possessing these small nuclei of monoclinic zirconia could be converted to the desired tetragonal and monoclinic zirconia during the steps of noble metal impregnation, drying and calcination. In this later instance, it is believed that the impregnation followed by final calcination step are responsible for the transformation of the zirconia into the desired, beneficial tetragonal and monoclinic zirconia comprising methane oxidation catalyst.

Alternatively, the zirconia precursor may be amorphous zirconia or a zirconium-comprising precursor, including zirconium hydroxide. Without wishing to be bound to any particular theory, it is believed that in case of an amorphous zirconia or zirconium-comprising precursor, the amorphous zirconia or zirconium-comprising precursor, during the calcination of step (a), is initially converted to tetragonal zirconia, and subsequently part of the tetragonal zirconia may be converted to monoclinic zirconia.

Therefore, the zirconia precursors for the preparation of the tm-$ZrO_2$ of this invention include, but are not limited to, tetragonal zirconia, amorphous zirconia and zirconium-comprising precursors, wherein suitable zirconium-comprising precursors include, but are not limited to zirconium hydroxides and zirconium hydroxide sols, zirconium hydroxide gels, $ZrOCl_2$, $ZrCl_4$, $ZrO(NO_3)_2$, $Zr(NO_3)_4$, zirconium lactate, zirconium alkoxides, zirconium acetate, $Zr(CH_2CHCO_2)_4$, Zirconium (IV) carbonate, $Zr(HPO_4)_2$, and $Zr(SO_4)_2$.

The zirconia precursor may contain impurities and other elements that are naturally present in the precursor compounds or are unintentionally introduced during the zirconia manufacturing process. The group of possible impurities and elements includes, but is not limited to the group consisting of hafnium and silicon compounds, for example, hafnia and silica.

The zirconia of the invention is a non-modified zirconia. Non-modified zirconia is defined as a zirconia or a zirconium-comprising compound that has not been modified or doped with another element or compound during the methane oxidation catalyst manufacturing process. Non-modified zirconia of this invention does not include sulfated zirconia or tungsten modified zirconia. As shown in the Examples, modified zirconia (i.e., sulfated or tungsten-modified zirconia) perform poorly in methane oxidation relative to the non-modified zirconia comprising methane oxidation catalyst of this invention. The presence of impurities and other elements that are naturally present in the zirconia precursor compounds, such as hafnium, or are unintentionally or intentionally introduced during the zirconia manufacturing process, such as silicon or silica, as described above, does not make the zirconia a modified zirconia.

During step (a), the zirconia precursor is calcined at a temperature in the range of from 675 to 1050° C. Although, depending on the nature of the precursor used, tetragonal zirconia may be present or will form at calcination temperatures above 500° C., significant conversion, e.g. of tetragonal zirconia, to monoclinic zirconia may occur at temperatures of 675° C. and higher. In some cases, the monoclinic zirconia does not form during this calcination step, or at least not at detectable levels. On the other hand, predominantly to almost pure monoclinic zirconia is obtained upon calcination at very high temperatures of 1100° C. and above. Preferably, the zirconia precursor is calcined at a temperature of in the range of from 750 to 1050° C. The catalysts thus obtained were found to have an improved methane oxidation activity. Even more preferably, the zirconia precursor is calcined at a temperature in the range of from 800 to 1025° C.

It is preferred to calcine the zirconia precursor for at least 30 minutes. The resulting zirconia precursor comprises tetragonal zirconia and monoclinic zirconia (if any) wherein the weight ratio of tetragonal zirconia to monoclinic zirconia is in the range of greater than 31:1.

The step of calcining the zirconia precursor is preferably performed in an oxygen-comprising atmosphere, preferably air.

In step (b) of the process, the zirconia obtained in step (a) is impregnated with a noble metal precursor-comprising impregnation solution. Preferably, the impregnation solution is an aqueous noble metal precursor-comprising impregnation solution. The noble metal precursor-comprising impregnation solution may comprise one or more noble metal precursors, preferably one or more noble metals selected from the group consisting of palladium, platinum, ruthenium, rhodium, osmium and iridium. More preferably, the noble metal precursor-comprising impregnation solution comprises one or more noble metals selected from the group consisting of palladium, platinum and rhodium. Alternatively, the impregnation of step (b) comprises two or more sequential impregnation steps with the same or different noble metal precursor-comprising impregnation solutions. Using different impregnation solutions may allow for an alternative way to achieve the impregnation of the zirconia with different noble metals. Any noble metal precursor that is soluble in the impregnation solution may be used. Suitable palladium, platinum and rhodium noble metal precursors include, but are not limited to, $Pd(NO_3)_2$, $Pd(NH_3)_4(CH_3CO_2)_2$, $Pd(NH_3)_4Cl_2$, $PdCl_2$, $Pd(CH_3CO_2)_2$, $Pd(NH_3)_4(HCO_3)_2$, Palladium (II) acetylacetonate, Palladium (II) citrate, Palladium (II) oxalate, $K_2PdCl_4$, $K_2PdCl_6$, $Pd(NH_3)_2Cl_4$, PdO, $Pd(NH_3)_2Cl_4$, $Pt(NH_3)_2Cl_4$, $H_2Pt(OH)_6$, $PtBr_2$, $PtCl_2$, $PtCl_4$, $(NH_4)_2PtCl_6$, $Pt(NH_3)_2Cl_2$, $Pt(CN)_2$, $Pt(NO_3)_2$, $Pt(NO_3)_4$, $PtO_2$, Platinum (II) acetylacetonate, Platinum (II) acetate, $Na_2PtCl_6$, $K_2PtCl_6$, $H_2PtCl_6$, $K_2PtCl_4$, Platinum (II) citrate, Platinum (II) oxalate, $RhCl_3$, $Rh_4(CO)_{12}$, $Rh_2O_3$, $RhBr_3$, Rhodium (II) acetylacetonate, Rhodium (II) citrate, Rhodium (II) oxalate and $Rh(NO_3)_3$.

It may be advantageous for the impregnating solution to comprise at least one or more noble metal complexing or chelating compounds in a molar ratio of a complexing or chelating compound to noble metal of from 1:1 to 5:1. Suitable complexing or chelating compounds include, but are not limited to citric acid, sorbitol, oxalic acid, tartaric acid, maleic acid, ethylenediaminetetraacetic acid, acetic acid, crown ethers, bipyridine, bipyrimidine, acetylacetone, ethyldiamine, phenanthroline, trisodium citrate, ammonium citrate, lactic acid, pantoic acid, hydroxypyruvic acid, mannitol, glucose, fructose, hydroxybutyric acid, and methyl cellulose. It was found that the addition of such noble metal complexing or chelating compounds, and in particular citric acid, to a palladium precursor-comprising impregnation solution may lead to higher catalyst activity for methane oxidation.

Following the impregnation, the wet noble metal-impregnated zirconia is dried in step (c) at a temperature of no more than 120° C. Preferably, the wet noble metal-impregnated zirconia is dried in step (c) for a period of at least 1 hour. The dried noble metal-impregnated zirconia is subsequently calcined in step (d) at a temperature in the range of from 400 to 650° C., preferably of from 450 to 600° C. Preferably, the dried impregnated zirconia is calcined in step (d) for a period of at least 1 hour. The step of calcining the noble metal-impregnated zirconia is preferably performed in an oxygen-comprising atmosphere, preferably air. During the calcining in step (d) at least part of the noble metal will be converted to noble metal oxides.

It may be advantageous, prior to drying and subsequently calcining the still wet noble metal-impregnated zirconia in steps (c) and (d), to allow the wet noble metal-impregnated zirconia to age for a period of at least 1 hour, preferably for a period of from 1 to 5 hours. It has been found that such an aging step may result in methane oxidation catalyst having a higher catalyst activity for methane oxidation.

After the calcination, the resulting zirconia in the methane oxidation catalyst comprises tetragonal zirconia and monoclinic zirconia wherein the weight ratio of tetragonal zirconia to monoclinic zirconia is in the range of from 1:1 to 31:1, preferably in the range of from 2:1 to 31:1, even more preferably 2:1 to 28:1, still more preferably 5:1 to 28:1, even still more preferably the range from 10:1 to 27.5:1 and yet even more preferably in the range of from 15:1 to 25:1, yet still even more preferably, 15:1 to 23:1. Calcination processes are well known in the art and the selection of the most suitable calcination temperature and calcination time will depend on the choice of the zirconia precursor. Such a selection of calcination conditions is within the skills of the person skilled in the art.

Where the weight ratio of tetragonal to monoclinic zirconia is within the range provided by the present invention, the exact choice of zirconia precursor, calcination procedure and temperature, which were used to come to such a weight ratio are of less significance.

Preferably, a sufficient amount of noble metals is provided during the impregnation to provide a methane oxidation catalyst comprising in the range of from 0.5 to 15 wt % of noble metal, based on the total combined weight of noble metal(s) and the total weight of the tm-$ZrO_2$. Preferably, thus obtained methane oxidation catalyst comprises at least 1 wt % of noble metal, based on the total combined weight of noble metal(s) and the total weight of the tm-$ZrO_2$.

The methane oxidation catalyst may be prepared in the form of particles, in particular particles with a size in the range of from 0.1 to 500 µm. Depending on the type of zirconia precursor used, the zirconia precursor may be shaped into particles of a desired particle size prior to step (a) or alternatively the zirconia obtained from step (a) may be shaped into particles of a desired particle size. Suitable methods for preparing the zirconia or zirconia precursor particles of a desired particle size include, but are not limited to: wet milling, wet grinding, dry grinding, mulling, thermal treatment, precipitation or spray drying. Such zirconia particles have a high surface area, allowing for an improved distribution of the noble metal on the zirconia, which is beneficial for the methane oxidation activity of the final catalyst. It has been found that some methods to reduce the particle size of the zirconia or zirconia precursor particles may cause a change to the crystallographic zirconia phase composition, i.e., change in the weight ratio of tetragonal to monoclinic zirconia in the zirconia. In particular, it has been observed that when using methods such as wet milling, wet grinding or dry grinding, the tetragonal zirconia that was present after the previous calcination at elevated temperatures could partially be transformed to monoclinic zirconia. In this case, the weight ratio of tetragonal to monoclinic zirconia in the tm-$ZrO_2$ could be slightly reduced. Without wishing to be bound to any particular theory it is believed that this further formation of monoclinic zirconia is caused by the occurrence of localized increases in the temperature caused by the friction between the particles and/or, in general, by the energy impact of the milling process on the crystalline tetragonal zirconia structure. This increased temperature may locally result in a small additional thermal conversion of tetragonal to monoclinic zirconia.

The methane oxidation catalyst according to the present invention may be prepared in any suitable form or size, including but not limited to the above mentioned particles, powders, extrudates, rings, pellets, tablets, or monoliths. The methane oxidation catalyst may be deposited on a substrate in the form of a layer, film or coating. In one preferred embodiment, the process for preparing the methane oxidation catalyst according to the invention comprises depositing the noble metal-impregnated zirconia after calcination in step (d) in the form of a layer, film or coating on a ceramic or metallic monolith substrate. In an equally preferred embodiment, the process for preparing the methane oxidation catalyst according to the invention comprises depositing the zirconia obtained in step (a) in the form of a layer, film or coating on a ceramic or metallic monolith substrate and subsequently impregnating and treating the zirconia deposited on the monolith substrate according to steps (b) to (d). Suitable ceramic or metallic monoliths have been described herein above. The zirconia or impregnated zirconia are preferably deposited by contacting the monolith with a suspension of zirconia, that is preferably aqueous or impregnated zirconia particles, in particular particles with a size in the range of from 0.1 to 500 µm. Preferably, the noble metal-impregnated zirconia obtained in step (d) or the zirconia obtained in step (a) is deposited on the ceramic or metallic monolith by a washcoating step. Typically, the noble metal-impregnated zirconia obtained in step (d) or the zirconia obtained in step (a) are provided in the form of a suspension to the washcoating step. In the washcoating step the zirconia or noble metal-impregnated zirconia particles are suspended in the washcoat suspension prior to application to the monolith substrate. Washcoating the substrate results in depositing of a thin layer of zirconia particles or noble metal-impregnated zirconia particles on the surface of the pore channels of the monolith substrate, which in turn maximizes the catalytically active surface of the catalyst available for the oxidation of methane. Where the noble metal-impregnated zirconia obtained in step (d) or the zirconia obtained in step (a) is deposited on the ceramic or metallic monolith substrate by a washcoating step, the preferred particle size of the noble metal-impregnated zirconia or the zirconia particles in the washcoat is in the range of from 0.1 to 50 µm, more preferably of from 0.1 to 20 µm as determined by light scattering. If the particle size of the zirconia is too large, the washcoat suspension may be subjected to wet milling in order to reduce the particle size of the zirconia or impregnated zirconia particles to sizes in the above mentioned range.

In one embodiment, the process for preparing a methane oxidation catalyst comprises following step (a), but before step (b):

(i) preparing an aqueous suspension of the zirconia containing in the range of from 10 to 65 wt % of zirconia based on the weight of the total suspension;

(ii) adding an acid to the aqueous suspension of zirconia particles to adjust the pH of the suspension to a pH of in the in the range of from 3 to 6, preferably of from 3.5 to 4.5;

(iii) wet milling the aqueous suspension of zirconia particles until the suspension comprises zirconia particles of an average particle size by volume of at most 20 µm as determined by light scattering and optionally readjusting pH of the milled suspension with an acid to maintain it in the range of from 3 to 6, preferably from 3.5 to 4.5;

(iv) washcoating a layer of the suspension obtained in step (iii) on the surface of a ceramic or metallic monolith substrate; and (v) drying the washcoated ceramic or metallic monolith substrate at a temperature of no more than 120° C. for a period of at least 1 hour.

In the subsequent step (b), the washcoated ceramic or metallic monolith substrate, and in particular the zirconia in the washcoat, is impregnated with the noble metal precursor-comprising impregnation solution after which it is dried and calcined according to step (c) and (d) to produce the finished methane oxidation catalyst. Optionally, the washcoated ceramic or metallic monolith substrate of step (v) is calcined at a temperature in the range of from 400 to 650° C., preferably of from 450 to 600° C., for a period of at least 1 hour prior to impregnation with the noble metal impregnation solution.

In an alternative embodiment, steps (i) to (v) are performed after step (d) using the noble metal-impregnated zirconia to prepare the aqueous suspension in step (i). In such a case step (v) is followed by a calcination of the dried washcoated ceramic or metallic monolith substrate at a temperature in the range of from 450 to 650° C., preferably of from 450 to 600° C., for a period of at least 1 hour to produce the finished methane oxidation catalyst.

The washcoating step may be performed using any suitable washcoating procedure, including but not limited to (1) dipping the monolith substrate into the suspension, (2) pouring the suspension over the monolith substrate or (3) forcing the suspension through the pore channels of the monolith substrate.

Optionally, in the range of from 5 to 20 wt %, based on the weight of the zirconia, of a binder material may be added to the zirconia particle suspension prior to step (iii). In addition, optionally, in the range of from 1 to 20 wt %, based on the weight of the zirconia in the suspension prepared in step (i), of a viscosity modifying compound may be added to the zirconia particle suspension prior to step (iii). Suitable viscosity modifying compounds include, but are not limited to acetic acid, citric acid, methyl cellulose, chitin, starch, glucose and fructose.

Alumina or zirconia may be used as a binder, but the amount of alumina or zirconia introduced as a binder in the catalyst should be limited to less than 20 wt %, based on the weight of the methane oxidation catalyst. If used, the amount of alumina or zirconia should be in the range of from 1 wt % to 20 wt %, preferably in the range of from 2 wt % to 10 wt %.

Preferably, in the range of from 50 to 400 kg, more preferably of from 75 to 300 kg, of zirconia, excluding any zirconia added as binder, is washcoated on the monolith substrate per $m^3$ of monolith substrate. Preferably, during the impregnation with the noble metal comprising impregnation solution, an amount of noble metal precursor is absorbed or adsorbed or deposited on the zirconia to obtain a final catalyst comprising in the range of from 1 to 16 kg of noble metal per $m^3$ of monolith substrate, more preferably in the range of from 1 to 8 kg of noble metal per $m^3$ of monolith substrate.

In another aspect, the invention provides a methane oxidation catalyst prepared by a process for preparing a methane oxidation catalyst according to the present invention.

In a further aspect, the invention provides a method of oxidizing methane. This method comprises contacting a gas stream comprising methane with a methane oxidation catalyst according to the present invention, as described herein, in the presence of oxygen and oxidizing at least part of the methane in the gas stream to carbon dioxide and water. In a certain instance, the gas stream comprising methane is an exhaust gas from a natural gas-fueled engine. The natural gas-fueled engine may be fueled by a fuel comprising atmospheric pressure natural gas, compressed natural gas, liquefied natural gas, or a combination thereof. In a particular aspect, the natural gas-fueled engine is fueled by compressed natural gas or liquefied natural gas. The natural gas fuel could be spark ignited or diesel ignited. Alternatively, the natural gas-fueled engine is fueled by a mixture of natural gas and one or more other hydrocarbon fuels, including, but not limited to gasoline, kerosene, diesel or gasoil, in particular a mixture of compressed natural gas or liquefied natural gas with diesel or gasoil. In another alternative, the natural gas-fueled engine may be fueled by either natural gas or by a hydrocarbon fuel.

Any natural gas-fueled engine is contemplated. Exemplary natural gas-fueled engines include heavy duty transport engines, such as those used in the trucking, mining, marine, and rail industries. Additional exemplary natural gas-fueled engines include stationary service engines, such as natural gas compressors, gas turbines, and power plant service engines. Natural gas-fueled engines may operate alternatively in either fuel-lean or fuel-rich burn modes. Fuel-lean burn mode refers to engine operation in which fuel is burned with an excess of air, i.e. oxygen. For example, in fuel-lean burn mode, oxygen molecules and methane molecules may be provided to the natural gas-fueled engine in a molar ratio of oxygen to methane molecules (also referred to as $O_2:CH_4$ ratio) up to 100:1. Fuel-rich burn mode, as used herein, means maintaining an, approximately, stoichiometric ratio of oxygen molecules to hydrocarbon molecules, i.e. an $O_2:CH_4$ ratio of 2. Preferably, the natural gas-fueled engine is operated in a fuel lean burn mode. By operating the natural gas-fueled engine in a fuel lean mode, at least part, and preferably all, of the oxygen required to oxidize the methane in the exhaust gas is provided as part of the exhaust gas.

The method to oxidize methane according to the present invention may be used with an exhaust gas which contains a methane concentration of less than or equal to 10000 ppm by volume (ppmv), preferably in the range of from 25 ppmv to 10000 ppmv, more preferably of from 50 to 5000 ppmv and even more preferably from 100 to 3000 ppmv.

Preferably, the methane and oxygen are contacted with the methane oxidation catalyst in a $O_2:CH_4$ ratio at least 2:1, more preferably at least 10:1, even more preferably at least 30:1, still even more preferably at least 50:1, yet more preferably at least 100:1. Preferably, the methane and oxygen are contacted with the methane oxidation catalyst in a $O_2:CH_4$ ratio of in the range of from 2:1 to 200:1, more preferably of from 10:1 to 200:1, even more preferably of from 30:1 to 200:1, still even more preferably of from 50:1 to 200:1, yet more preferably if from 100:1 to 200:1.

Preferably, the methane and oxygen are contacted with the methane oxidation catalyst at a temperature in the range of from 120 to 650° C., more preferably of from 250 to 650° C., still more preferably 300 to 600° C.

The oxygen used to oxidize the methane may be provided as part of the gas stream comprising methane, for instance the exhaust gas, and/or from an external source, such as air, oxygen enriched air, pure oxygen or mixtures of oxygen with one or more other, preferably inert, gases. Optionally, where part or all of the oxygen is provided from a source other than an exhaust gas it may be advantageous to preheat the oxygen prior to contacting the oxygen with the methane.

The gas stream comprising methane may further comprise in the range of from 0 to 20 vol % water, preferably of from 8 to 15 vol %.

The gas stream which comprises methane may further comprise from 0 to 50 ppm by volume of $SO_2$, preferably of from 0 to 30 ppm by volume of $SO_2$. Sulphur is known to those skilled in the art for its ability to deactivate noble metal catalysts. To reduce sulphur-based deactivation of the catalyst, the method according to the invention may therefore include contacting the gas stream comprising methane with a $SO_2$ absorbent, prior to contacting the methane oxidation catalyst, to remove at least part of the $SO_2$ from the gas stream comprising methane.

In a particular application, the step of contacting a stream which comprises methane with the methane oxidation catalyst occurs at a stream gas hourly space velocity (GHSV) in the range of from 10,000 to 120,000 hr$^{-1}$, preferably of from 20,000 to 100,000 hr$^{-1}$.

In a specific application, the method of oxidizing methane results in at least 50 vol % of the methane in the stream being oxidized at a temperature of equal to or less than 450° C., preferably 405° C., more preferably 400° C., still more preferably 395° C., even still more preferably 390° C.

EXAMPLES

The following examples illustrate the present invention but are not intended to limit the scope of the invention.
The following test procedures were used:
Test Procedures
Catalyst Performance Evaluation Test The catalyst methane oxidation activity measurements were carried out in a fully automated parallelized, high throughput catalyst testing rig with 48 fixed bed reactors (each reactor with a total volume of 1 mL) made from stainless steel. The catalysts were tested using simulated exhaust gas compositions and operating conditions similar to those of natural gas fueled engines operated with an oxygen surplus (fuel-lean). The conditions used for the testing are shown in Table 1.

TABLE 1

| | |
|---|---|
| Temperature range | 375-550° C. |
| Pressure | Ambient |
| Exhaust gas composition | 2000 ppmv $CH_4$, 1000 ppmv CO, 150 ppmv NO, 7.5 vol % $CO_2$, 6 vol % $O_2$, 15 vol % $H_2O$, balance $N_2$ |
| GHSV | 50000 hr$^{-1}$ |
| Mass of catalyst | 0.2 g |
| Catalyst particle size fraction | 315-500 μm |

A sieved fraction of the catalysts with particle sizes from 315-500 μm was used for the catalytic performance testing. For the reactor loading, the desired catalyst mass was diluted with an inert material (corundum) of the same particle size fraction to a total reactor volume of 1 mL. This was done in order to mimic a methane oxidation catalyst provided on a monolith substrate with a deposition of 200 g of a methane oxidation catalyst washcoat per liter of catalyst volume (including the monolith substrate).

The $T_{50}$ ($CH_4$) values (temperature requirement for 50 vol % $CH_4$ conversion after >100 h time-on-stream) were used as criteria for the evaluation of methane oxidation activity. The comparison of methane oxidation activity was done at equal noble metal loading levels (4 wt %) for all catalysts. The CO conversion during these tests was determined to be 100% for all tested catalytic materials in the temperature range described in Table 1.
Quantitative Analysis of Crystalline Tetragonal and Monoclinic $ZrO_2$ Phases Composition The powder XRD crystallographic phases analysis of zirconia based catalytic materials was carried out on a Bruker D8 Advance X-ray diffraction system (Diffrac.EVA software, Bragg-Brentano geometry; high resolution LYNX-EYE XE detector; Cu Kα radiation (λ=1.5406 Å) in the 2θ range from 5° to 140°; 1° steps; scan rate 0.02°/sec; goniometer radius 28 cm; Ni filter; applied power 40 kV/40 mA).

The quantitative phase analysis was carried out for diffraction patterns of samples using the TOPAS software package (Version 4.2) available from Bruker company. Reference materials were used for peak identification [tetragonal zirconia (00-050-1089)/monoclinic zirconia (00-037-1484)/palladium oxide (00-041-1107)]. These reference materials data are available in the TOPAS software package. Quantitative phase analysis was performed using software assisted Rietveld refinement. The refinement was performed by least-square fitting of a theoretical powder diffraction pattern against the measured powder diffraction pattern. The fitting included a Chebychev polynomial fit and a Pearson VII profile fit function while having lattice parameters and crystallite sizes as open parameters. For each fitted powder diffraction pattern the presence of tetragonal zirconia, monoclinic zirconia and palladium oxide was verified. The quantification method resulted in phase content by weight which was used for the calculation of phase ratio by weight by dividing the phase content of tetragonal zirconia by the phase content of monoclinic zirconia. Alternatively, the tetragonal to monoclinic zirconia phase ratio could be determined as a ratio of signal intensities at $2\theta=30.1°$ characteristic for tetragonal zirconia phase and at $2\theta=28.1°$ characteristic for monoclinic zirconia phase.

Samples and Sample Preparation

Several samples of methane oxidation catalyst were prepared in support of the present invention.

Sample 1 (t-$ZrO_2$ Prepared Via Calcination of Amorphous Zirconium Hydroxide)

10 g of a zirconium hydroxide powder with average particle size of 5.5 μm, loss of ignition (LOI) as determined in air at 600° C. of 33.2 wt. % and amorphous crystallographic phase structure was calcined in a flow of air using 5° C./min heating rate to a temperature of 850° C. and held at this temperature for 12 hours.

Sample 1A (tm-$ZrO_2$)

For the preparation of the tm-$ZrO_2$, a 5 g quantity of Sample 1 was impregnated with an impregnating solution containing 0.643 mL of a 4.5 mol/L aqueous nitric acid solution and 0.607 mL of deionized (further referred to as DI) water. The impregnated wet powder was then stored in a sealed container for 5 hours, dried at 80° C. for 16 hours and subsequently calcined in a flow of air using 5° C./min heating rate to 600° C. and held at this temperature for 12 hours.

Sample 1B (Pet/tm-$ZrO_2$ Catalyst)

For the preparation of the Pd/tm-$ZrO_2$ catalyst, a 4.5 g quantity of Sample 1A was impregnated with 0.477 mL of an aqueous $HNO_3$-containing $Pd(NO_3)_2$ solution (Pd concentration 3.651 mol/L) diluted with 0.423 mL DI water prior to impregnation to match the pore volume of the zirconia. The impregnated wet sample was then aged for 3 hours in a closed container at room temperature and dried for 16 hours at 80° C. in a drying oven. Subsequently, the prepared catalyst sample was placed in an oven and calcined in a flow of air using 5° C./min heating rate to 600° C. and held at this temperature for 12 hours. The Pd content of the final Pd/tm-$ZrO_2$ catalyst was determined to be 4 wt. %, based on the whole catalyst sample.

Comparative Sample 4 (t-$ZrO_2$)

A tetragonal zirconia powder (Saint-Gobain, ID #SZ61152, 3 mm diameter, lot #2005820395) was crushed and sieved to obtain a fraction with particle sizes in the range of 315-500 μm. The resulting powder was then calcined in a flow of air using 5° C./min heating rate to 650° C. and held at this temperature for 12 hours.

Comparative Sample 4A (Pd/t-$ZrO_2$ Catalyst)

A methane oxidation catalyst was prepared using 3 g of the zirconia of Sample 4, which was impregnated with 1.164 mL of an aqueous $HNO_3$-containing $Pd(NO_3)_2$ solution (Pd concentration 1 mol/L) which was diluted with 0.636 mL of DI water prior to impregnation. The impregnated sample was aged for 3 hours in a closed container at room temperature and dried for 16 hours at 80° C. in a drying oven. Subsequently, the catalyst sample was placed in an oven and calcined in a flow of air using 5° C./min heating rate to 600° C. and held at this temperature for 12 hours. The Pd content of the final catalyst sample was determined to be 4 wt. %, based on the whole catalyst sample.

Comparative Sample 5 (m-$ZrO_2$)

A monoclinic zirconia powder (Saint-Gobain, ID #SZ31164, 3.175 mm diameter, lot #SN2004910029) was crushed and sieved to obtain a fraction with particle sizes in the range of 315-500 μm. The resulting powder was calcined in a flow of air using 5° C./min heating rate to 650° C. and holding at this temperature for 12 hours.

Comparative Sample 5A (Pd/m-$ZrO_2$ Catalyst)

An amount of 3 g of Comparative Sample 5 was impregnated with 1.162 mL of an aqueous $HNO_3$-containing $Pd(NO_3)_2$ solution (Pd concentration 1 mol/L) which was diluted with 1.238 mL of DI water prior to impregnation. The impregnated sample was then aged for 3 hours in a closed container at room temperature and dried for 16 hours at 80° C. in a drying oven. Subsequently, the catalyst sample was placed in an oven and calcined in a flow of air using 5° C./min heating rate to 600° C. and held at this temperature for 12 hours. The Pd content of the final catalyst sample was determined to be 4 wt. %, based on the whole catalyst sample.

Comparative Sample 6 (Gamma-$Al_2O_3$)

An alumina extrudate sample (Saint-Gobain, ID #SA 6175, 1.59 mm diameter, lot #9608006) was crushed and sieved in order to obtain a fraction with particle sizes in the range of 315-500 μm. The resulting powder was then calcined in air at 650° C. for 12 h.

Comparative Sample 6A (Pd/$Al_2O_3$ Catalyst)

An amount of 50 g of the gamma-alumina of Sample 6 was impregnated with a solution of 18.78 mL aqueous $HNO_3$-containing $Pd(NO_3)_2$ (conc. 1 mol/L) which was diluted with 31.22 mL of DI water prior to impregnation. The impregnated wet catalyst sample was then aged for 3 hours in a closed container at room temperature and dried for 16 hours at 80° C. in a drying oven. Subsequently, the dried catalyst sample was calcined in a flow of air by heating it at 5° C./min to 600° C. and holding at this temperature for 12 hours. The Pd content of the obtained catalyst sample was found to be 4 wt. %, based on the whole catalyst sample.

Comparative Sample 7 (PdPt/Gamma-$Al_2O_3$ Catalyst)

An alumina extrudate sample (Saint-Gobain, ID #SA 6175, 1.59 mm diameter, lot #9608006) was crushed and sieved in order to obtain a fraction with particle sizes on the range of 315-500 μm. The resulting powder was calcined in air at 650° C. for 12 h. For the impregnation with noble metal, 3 g of the alumina fraction was impregnated with a solution containing 0.97 mL aqueous $HNO_3$-containing $Pd(NO_3)_2$ (conc. 1 mol/L) and 0.22 mL aqueous $HNO_3$-containing $Pt(NO_3)_2$ (conc. 0.5 mol/L) which was diluted with 0.62 mL of DI water prior to impregnation. The obtained wet catalyst sample was aged for 3 hours in a closed container at room temperature and dried for 16 hours at 80° C. in a drying oven. Subsequently, the catalyst was calcined in a flow of air using 5° C./min heating rate to 600° C. and held at this temperature for 12 hours. The total (Pd and Pt) noble metal content of the final catalyst was found to be 4 wt. %; 3.6 wt. % Pd and 0.4 wt. % Pt, based on the whole catalyst sample.

Comparative Sample 8 (Physically Mixed t-ZrO$_2$ and m-ZrO$_2$)

A tetragonal zirconia powder (Saint-Gobain, ID #SZ61152, 3 mm diameter, lot #2005820395) was crushed and sieved to obtain a fraction with particle sizes from 315-500 μm. The resulting powder was then calcined in a flow of air using 5° C./min heating rate to 650° C. and holding at this temperature for 12 hours to obtain zirconia that shows only XRD reflections belonging to t-ZrO$_2$ (Zirconia powder A). A monoclinic zirconia powder (Saint-Gobain, ID #SZ31164, 3.175 mm diameter, lot #SN2004910029) was crushed and sieved to obtain a fraction with particle sizes from 315-500 μm. The resulting powder was calcined in a flow of air using 5° C./min heating rate to 650° C. and holding at this temperature for 12 hours to obtain a zirconia which exhibited powder XRD reflections belonging to pure m-ZrO$_2$ (zirconia powder B). Both zirconia powders were mixed to prepare a physical mixture containing 95 wt. % (t-ZrO$_2$, zirconia powder A) and 5 wt. % (m-ZrO$_2$, zirconia powder B) ratio, equivalent to a tetragonal to monoclinic weight ratio of 19:1.

Comparative Sample 8A (Pd/Physical Mixture t-ZrO$_2$/m-ZrO$_2$ Catalyst)

An amount of 1.5 g of the physically mixed t/m-ZrO$_2$ powder of Comparative Sample 7 was impregnated with 0.582 mL of an aqueous HNO$_3$-containing Pd(NO$_3$)$_2$ solution (Pd concentration 1 mol/L). Prior to impregnation, the above Pd(NO$_3$)$_2$ solution was diluted with 0.093 mL of DI water. The wet catalyst sample was then aged for 3 hours in a closed container at room temperature and then dried for 16 hours at 80° C. in a drying oven. Subsequently, the dried catalyst sample was placed in an oven and calcined in a flow of air using 5° C./min heating rate to 600° C. and holding at this temperature for 12 hours. The Pd content of the final catalyst was determined to be 4 wt. %, based on the whole catalyst sample invention.

Comparative Sample 9 (t-ZrO$_2$—S)

A tetragonal, sulfur-modified zirconia powder (Saint-Gobain, ID #SZ61192, 3 mm diameter, lot #2013820069) was crushed and sieved to obtain a fraction with particle sizes in the range of 315-500 μm. The resulting powder was calcined in a flow of air using 5° C./min heating rate to 650° C. and holding at this temperature for 12 hours.

Comparative Sample 9A (NU t-ZrO$_2$—S Catalyst)

An amount of 3 g of Comparative Sample 9 was impregnated with 1.163 mL of an aqueous HNO$_3$ containing Pd(NO$_3$)$_2$ solution (Pd concentration 1 mol/L) which was diluted with 0.036 mL of DI water prior to impregnation. The impregnated t-ZrO$_2$—S sample was then aged for 3 hours in a closed container at room temperature and dried for 16 hours at 80° C. in a drying oven. Subsequently, the catalyst sample was placed in an oven and calcined in a flow of air using 5° C./min heating rate to 600° C. and held at this temperature for 12 hours. The Pd content of the final PD/t-ZrO$_2$—S catalyst sample was determined to be 4 wt. %, based on the whole catalyst sample.

Comparative Sample 10 (t-ZrO$_2$—W)

A tetragonal, tungsten-modified zirconia powder (Saint-Gobain, ID #SZ61143, 3 mm diameter, lot #2014820006) was crushed and sieved to obtain a fraction with particle sizes in the range of 315-500 μm. The resulting powder was calcined in a flow of air using 5° C./min heating rate to 650° C. and holding at this temperature for 12 hours.

Comparative Sample 10A (Pd/t-ZrO$_2$—W Catalyst)

An amount of 3 g of Comparative Sample 10 was impregnated with 0.580 mL of an aqueous HNO$_3$ containing Pd(NO$_3$)$_2$ solution (Pd concentration 1 mol/L) which was diluted with 0.560 mL of DI water prior to impregnation. The impregnated sample was then aged for 3 hours in a closed container at room temperature and dried for 16 hours at 80° C. in a drying oven. Subsequently, the sample was impregnated for a second time with 0.580 mL of an aqueous HNO$_3$ containing Pd(NO$_3$)$_2$ solution (Pd concentration 1 mol/L) which was diluted with 0.560 mL of DI water prior to impregnation. The impregnated sample was then aged for 3 hours in a closed container at room temperature and dried for 16 hours at 80° C. in a drying oven. Finally, the catalyst sample was placed in an oven and calcined in a flow of air using 5° C./min heating rate to 600° C. and held at this temperature for 12 hours. The Pd content of the final Pd/t-ZrO$_2$—W catalyst sample was determined to be 4 wt. %, based on the whole catalyst sample.

Results

The analysis of the powder XRD patterns for the different samples of this invention and these of prior art resulted in the determination of the following tetragonal and monoclinic crystallographic phases ratios (see Table 2):

TABLE 2

| Sample | Tetragonal/monoclinic ZrO$_2$ weight ratio |
| --- | --- |
| 1A | 11.2:1 |
| 4A | 37.2:1 |
| 5A | 100% m-ZrO$_2$ |

Table 3 shows the $T_{50}(CH_4)$ values of the zirconia based catalyst Samples 1B and comparative catalyst Samples 4A and 5A. Table 3 further shows the $T_{50}(CH_4)$ value for alumina based comparative catalyst Sample 6A.

TABLE 3

| sample | $T_{50}(CH_4)$ [° C.] |
| --- | --- |
| 1B | 401 |
| 4A* | 404 |
| 5A* | 413 |
| 6A* | 479 |

*Comparative Samples

The invention claimed is:

1. A process for preparing a methane oxidation catalyst comprising the following steps:
   a.) calcining a non-modified zirconia precursor at a temperature in the range of from 675 to 1050° C. to prepare a calcined zirconia precursor comprising tetragonal zirconia, wherein the weight ratio of tetragonal zirconia to monoclinic zirconia, if any is present, is greater than 31:1;
   b.) impregnating the zirconia obtained from step b.) with a noble metal precursor-comprising impregnation solution to generate a wet noble metal-impregnated zirconia;
   c.) drying the wet noble metal-impregnated zirconia at a temperature of no more than 120° C. to generate a dried noble metal-impregnated zirconia; and
   d.) calcining the dried noble metal-impregnated zirconia at a temperature in the range of from 400 to 650° C. to prepare a methane oxidation catalyst, wherein the weight ratio of tetragonal zirconia to monoclinic zirconia of the catalyst is in the range of from 1:1 to 31:1.

2. The process of claim 1, wherein the weight ratio of tetragonal zirconia to monoclinic zirconia of the calcined zirconia precursor in step a.) is in the range of from 35:1 to 1000:1.

3. The process of claim 1, wherein no detectable monoclinic zirconia is present after the calcination of step a.).

4. The process of claim 1, further comprising depositing the dried noble metal-impregnated zirconia after calcination in step d.) in the form of a layer, film or coating on a ceramic or metallic monolith substrate.

5. The process of claim 1, further comprising depositing the calined zirconia precursor obtained in step a.) in the form of a layer, film or coating on a ceramic or metallic monolith substrate and subsequently impregnating and treating the deposited calcined zirconia precursor according to steps (b) to (d).

6. The process of claim 1, wherein the noble metal-impregnated zirconia obtained in step d.) or the calcined zirconia precursor obtained in step a.) is deposited on a ceramic or metallic monolith by a washcoating step.

7. The process of claim 1, wherein the impregnation solution comprises a noble metal precursor selected from the group consisting of palladium compounds, platinum compounds, rhodium compounds and mixtures thereof.

8. The process of claim 1, wherein the impregnation solution comprises at least one or more noble metal complexing or chelating compounds in a molar ratio of the complexing or chelating compounds to noble metal of from 1:1 to 5:1.

9. The process of claim 1, wherein the calcination in step a.) is carried out at a temperature in the range of from 800 to 1025° C.

10. The process of claim 1, wherein the non-modified zirconia precursor comprises tetragonal zirconia.

11. The process of claim 1, wherein the non-modified zirconia precursor is not sulfated and not tungsten-modified.

12. The process of claim 1, wherein the monoclinic zirconia is present as a dispersion of monoclinic zirconia in the tetragonal zirconia of step d.).

13. The process of claim 4, wherein the methane oxidation catalyst is deposited on a ceramic or metallic monolith substrate comprising pore channels, defining an inner pore channel surface, and wherein the methane oxidation catalyst is deposited in the form of a coating, washcoat or a film of a thickness in the range of from 10 to 250 μm on the inner pore channel surface.

14. The process of claim 1, wherein the dried noble metal-impregnated zirconia comprises in the range of from 0.5 to 15 wt % of total noble metals, based on the total weight of the noble metal(s) and tetragonal and monoclinic zirconia.

15. A methane oxidation catalyst prepared by the process according to claim 1.

16. A method of oxidizing methane by contacting a gas stream comprising methane with a methane oxidation catalyst according to claim 15 in the presence of oxygen and oxidizing at least part of the methane in the gas stream to carbon dioxide and water.

17. A method according to claim 16, wherein the stream comprising methane is an exhaust gas from a natural gas-fueled engine.

* * * * *